G. HOEPNER.
MACHINE FOR MIXING POWDERED OR GRANULAR MATERIALS.
APPLICATION FILED JULY 26, 1919.
1,349,960. Patented Aug. 17, 1920.
7 SHEETS—SHEET 1.
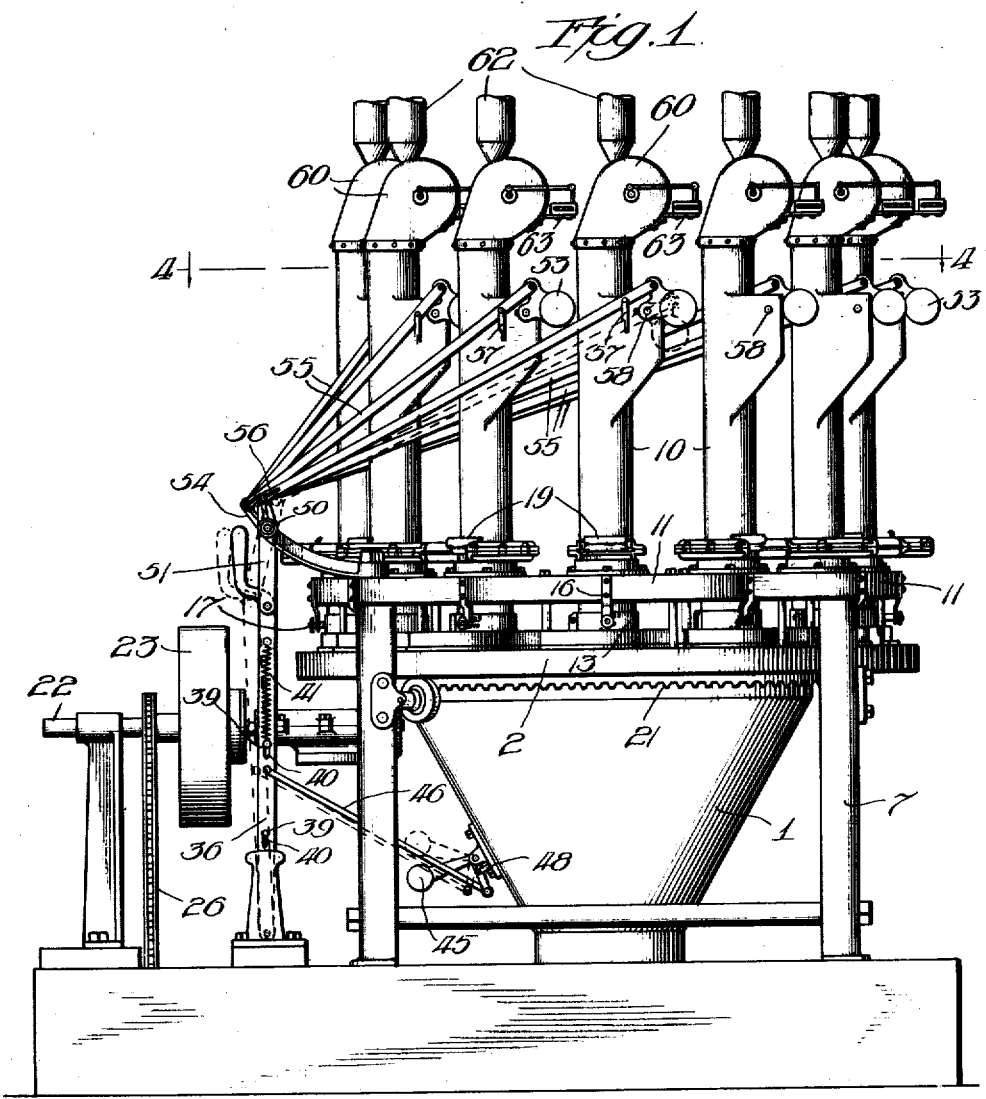
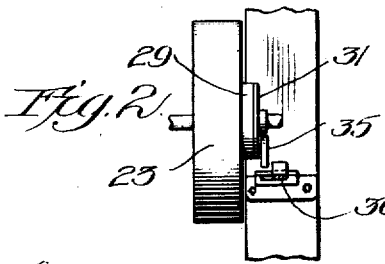
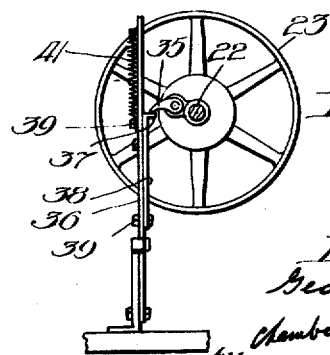

G. HOEPNER.
MACHINE FOR MIXING POWDERED OR GRANULAR MATERIALS.
APPLICATION FILED JULY 26, 1919.
1,349,960. Patented Aug. 17, 1920.
7 SHEETS—SHEET 2.
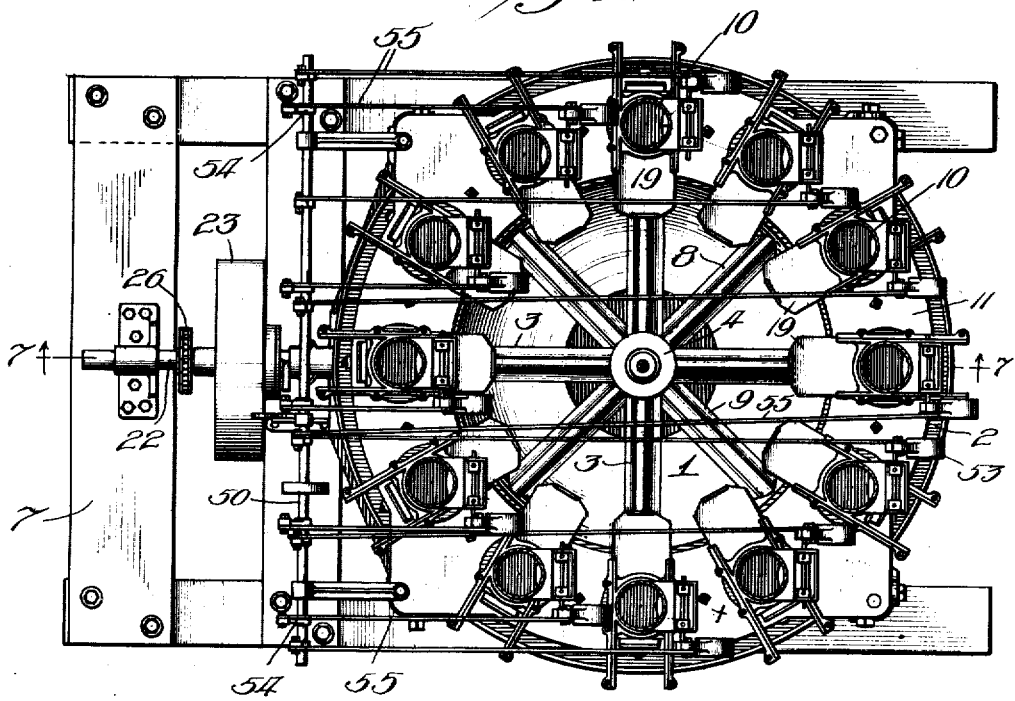
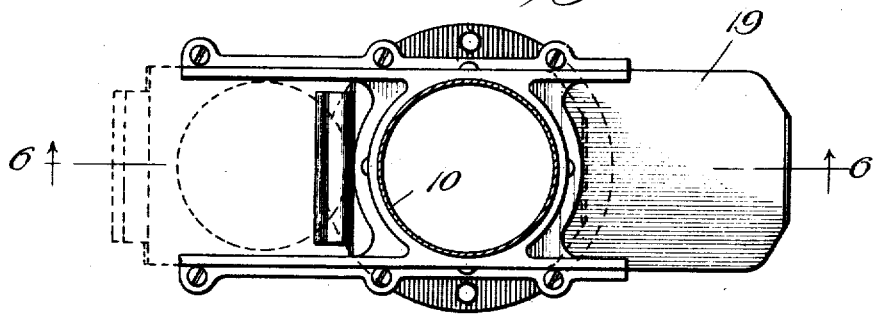
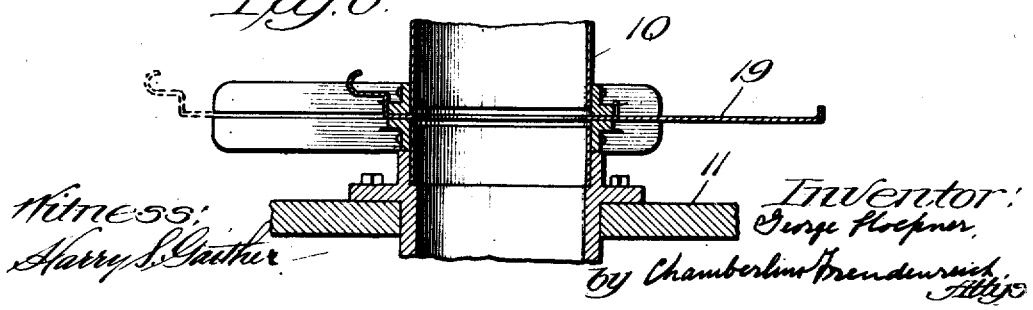

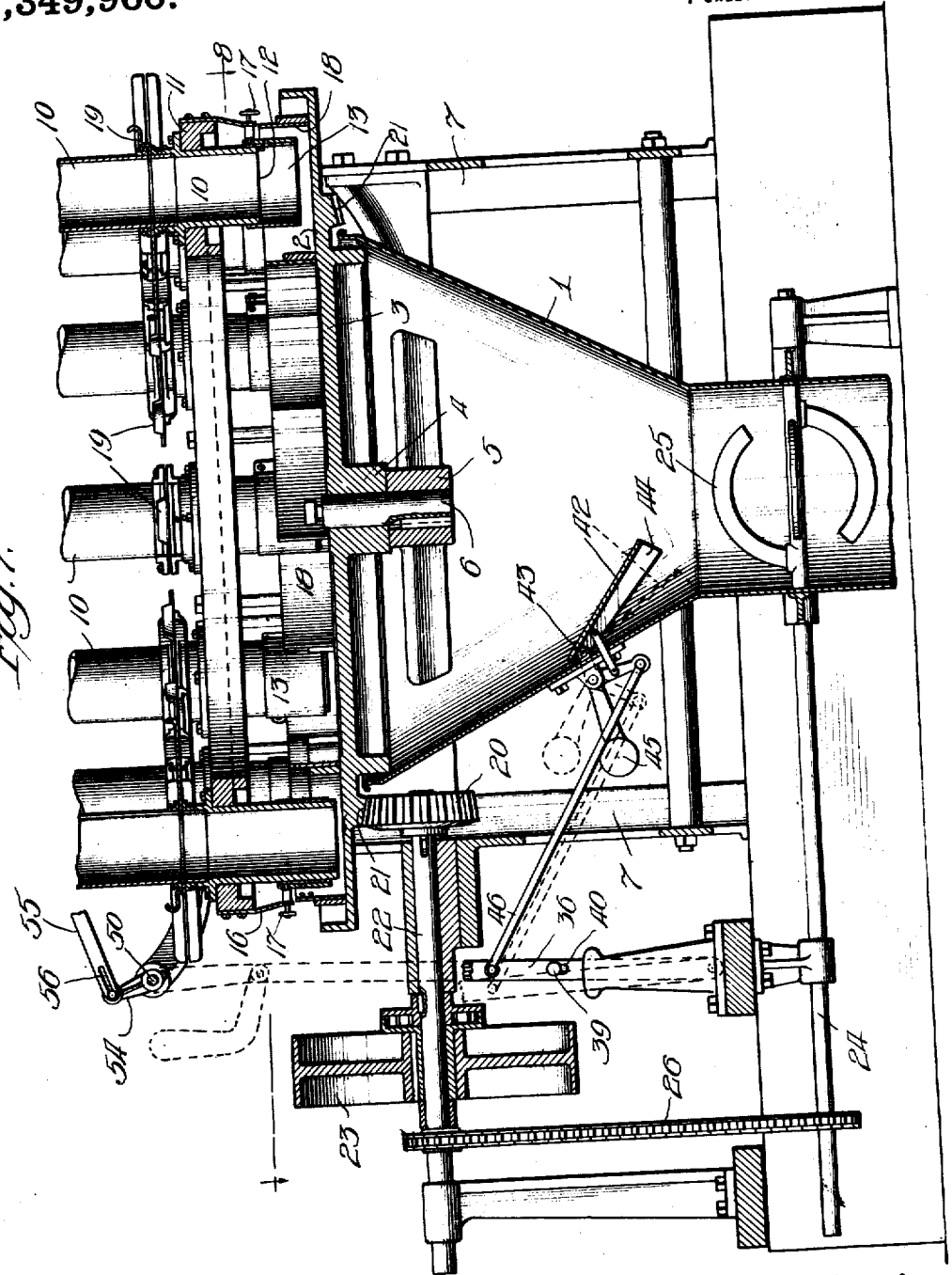

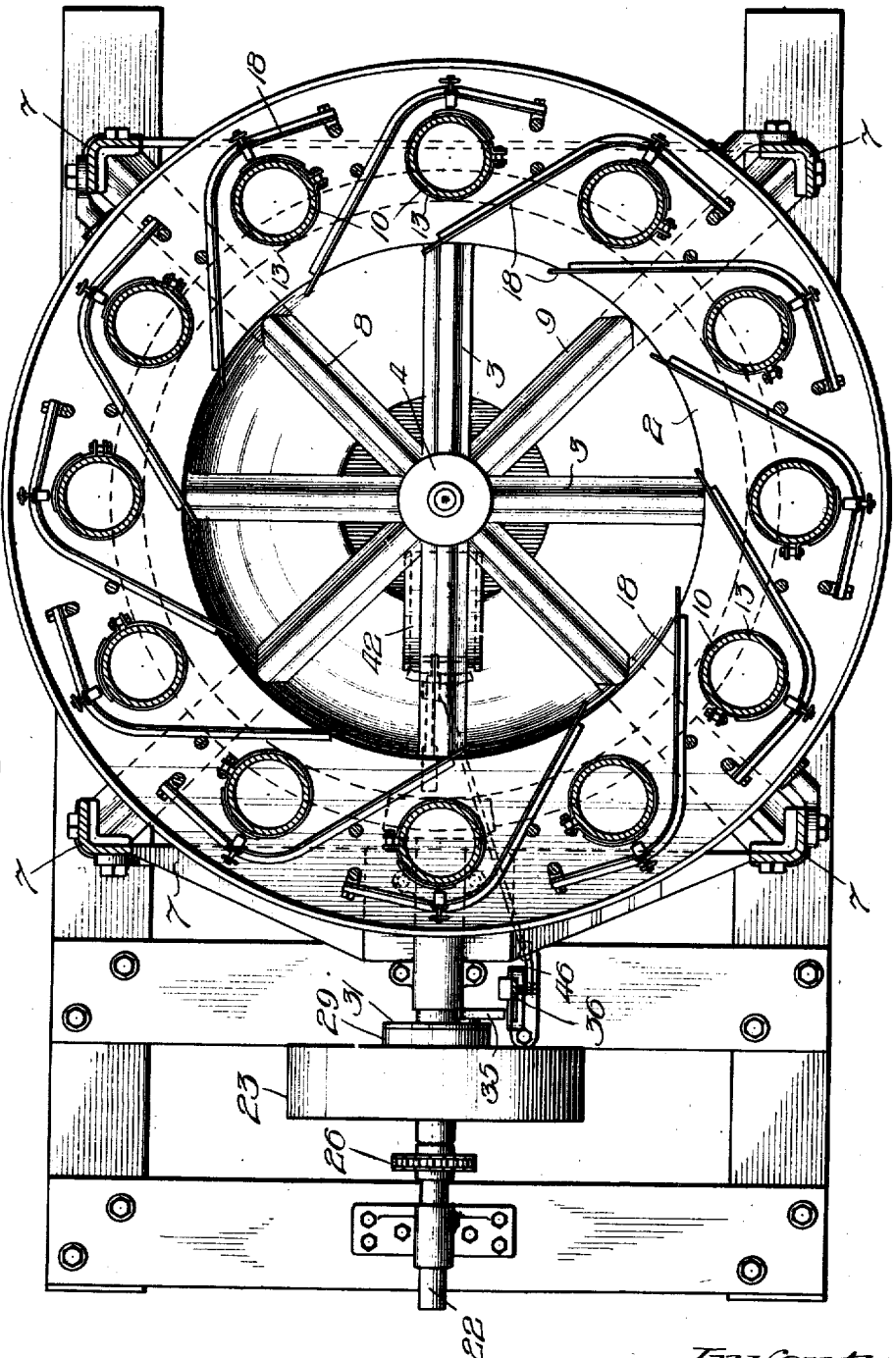

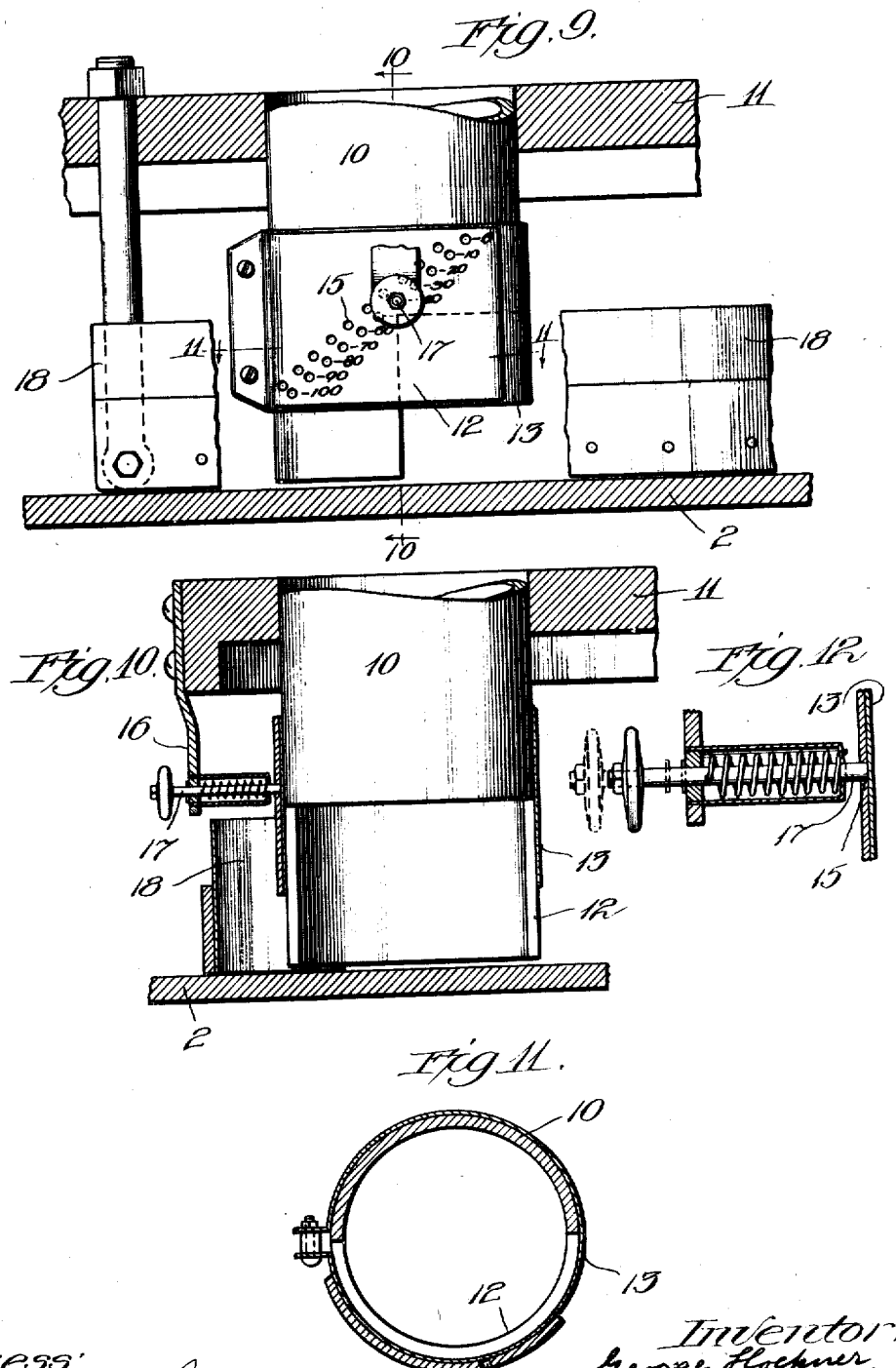

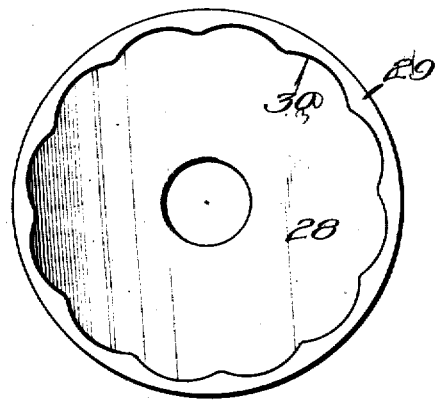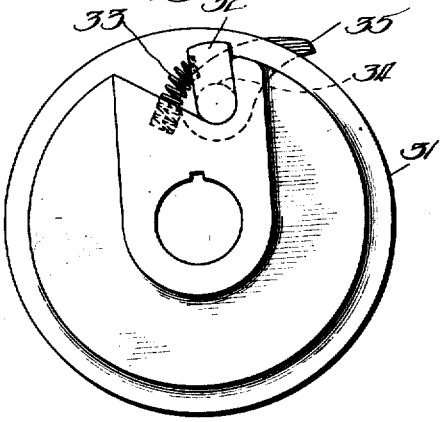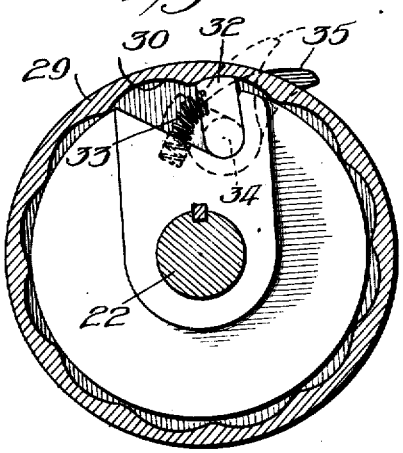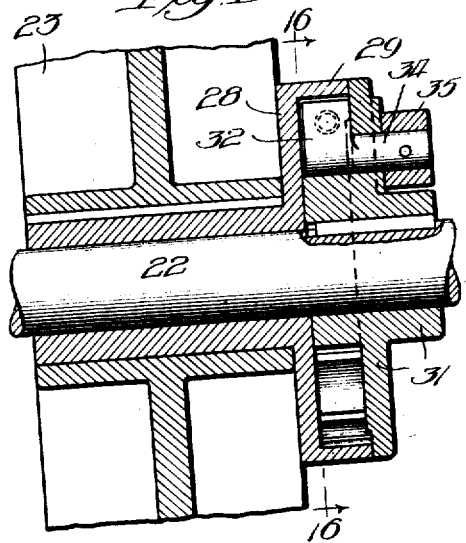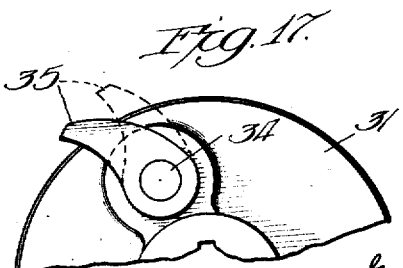

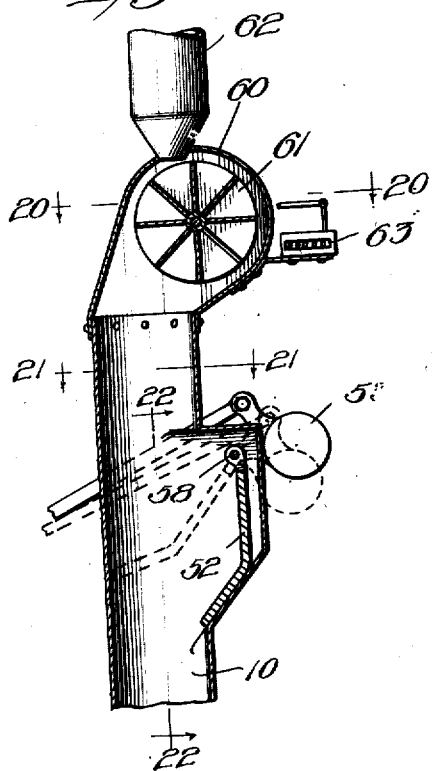
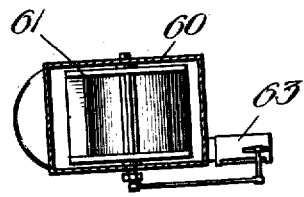
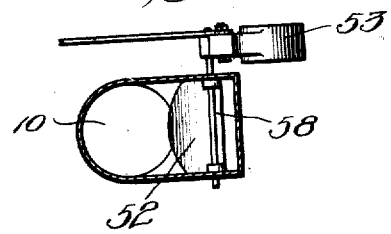
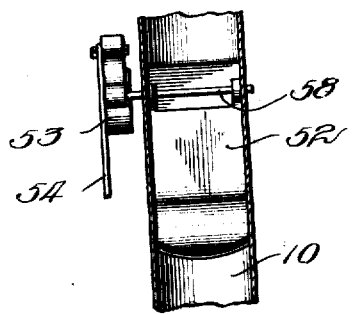
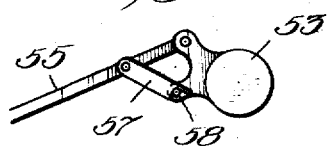

UNITED STATES PATENT OFFICE.

GEORGE HOEPNER, OF CHICAGO, ILLINOIS.

MACHINE FOR MIXING POWDERED OR GRANULAR MATERIALS.

1,349,960.   Specification of Letters Patent.   Patented Aug. 17, 1920.

Application filed July 26, 1919. Serial No. 313,554.

*To all whom it may concern:*

Be it known that I, GEORGE HOEPNER, a citizen of the United States, residing at Chicago, county of Cook, State of Illinois, have invented a certain new and useful Improvement in Machines for Mixing Powdered or Granular Materials, and declare the following to be a full, clear, and exact description of the same, such as will enable others skilled in the art to which it pertains to make and use the same, reference being had to the accompanying drawings, which form a part of this specification.

In preparing foods, it is often necessary to mix together various different ingredients in definite proportions. The object of the present invention is to produce a simple and novel machine which will automatically measure and intimately mix any desired number, (within limits,) of powdered or granular foods or other goods in any desired proportions.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a side elevation of a machine arranged in accordance with a preferred form of my invention;

Fig. 2 is a top plan view of the main driving pulley and clutch;

Fig. 3 is a side elevation of the parts shown in Fig. 2, looking at the right hand side of Fig. 2;

Fig. 4 is a section taken approximately on line 4—4 of Fig. 1;

Fig. 5 is an enlarged view corresponding to a portion of Fig. 4, illustrating one of the delivery spouts and its shut-off valve;

Fig. 6 is a section taken approximately on line 6—6 of Fig. 5;

Fig. 7 is a vertical central section through the machine taken approximately on line 7—7 of Fig. 4;

Fig. 8 is a section taken approximately on line 8—8 of Fig. 7;

Fig. 9 is a side elevation of the lower end of one of the delivering and measuring spouts, adjacent parts being broken away and shown in section;

Fig. 10 is a section taken approximately on line 10—10 of Fig. 9, the body of the spout being shown in elevation;

Fig. 11 is a section taken approximately on line 11—11 of Fig. 9;

Fig. 12 is an enlarged sectional detail of the catch for holding the adjustable end of the spout in place;

Fig. 13 is a side elevation of the driving member of the main clutch of the machine;

Fig. 14 is a side elevation of the driving member of the main clutch, showing the side thereof which lies adjacent to that side of the driving member appearing in Fig. 13;

Fig. 15 is an axial section through the assembled clutch members, the driving pulley being shown in section and the driven shaft in elevation;

Fig. 16 is a section taken approximately on line 16—16 of Fig. 15;

Fig. 17 is a view similar to Fig. 14, showing the opposite side of the driven clutch member, and showing only a fragment of said member;

Fig. 18 is an axial section through the upper end of one of the delivering and measuring spouts, illustrating a meter device and a clutch controller;

Fig. 19 is a top plan view of the parts shown in Fig. 18;

Fig. 20 is a section taken approximately on line 20—20 of Fig. 18, the parts lying below the meter being omitted;

Fig. 21 is a section taken approximately on line 21—21 of Fig. 18;

Fig. 22 is a section taken approximately on line 22—22 of Fig. 18; and

Fig. 23 is a side elevation of a fragment of one of the controllers, illustrating a means for holding it in an idle position.

Reference being had to the drawings, 1 represents a large stationary funnel-shaped receiver overlying which is a rotatable top or table, 2, in the form of annulus or ring which conveniently has radial arms, 3, like the spokes of a wheel; the arms radiating from a central hub, 4. The hub rests upon a suitable supporting bearing, 5, provided with an upwardly projecting stub shaft or trunnion, 6, which passes through the hub of the table and holds the table centered while permitting it to rotate. The receiver is conveniently made of comparatively light material and therefore the supporting bearing 5 for the table is preferably carried by a suitable structure constituting or forming part of the frame of the machine. In the arrangement shown, the frame of the machine as a whole is indicated at 7 and the supporting bearing, 5, is carried by two rigid horizontal beams, 8 and 9, supported at their ends by the framework and passing diametrically through the upper portion of the receiver at right angles to each other. Arranged above the table are a series of measuring and delivering spouts, 10, preferably spaced uniformly apart and having their lower ends extending close to the table. The spouts may conveniently be supported by a stationary annulus or ring, 11, lying above and parallel with the table and suitably supported from the frame of the machine. The lower end of each of the spouts is conveniently made as shown in detail in Figs. 9 to 12. Approximately one-half of the lower end of each spout is cut away, preferably along a vertical plane passing through the axis of rotation of the table; thus forming a discharge outlet, 12, at one side of the lower end of each spout. The spouts are preferably all alike and similarly placed with respect to their discharge outlets so that when the table is rotated in the manner hereinafter described, a given point thereon will approach each spout from the unmutilated side.

Around the lower end of each spout is a closely fitting sleeve, 13, at least as long as the height of the discharge outlet; the purpose of the sleeve being completely to close the discharge outlet or to uncover it to any desired extent. Suitable means are provided for permitting the sleeves to be quickly and accurately adjusted and to be thereafter held in their adjusted positions against accidental displacement. In the arrangement shown, each sleeve is provided with a series of depressions, 15, distributed at different points along the length or height of the sleeve; all or a sufficient number of the depressions being marked with suitable indicating characters. Depending from the stationary ring, 11, beside each of the delivery spouts is an arm, 16, carrying a suitable spring-held plunger, 17, which is adapted to seat itself into any one of the recesses or depressions in the corresponding sleeve. In the arrangement shown, there are twenty different depressions in each sleeve, so spaced that whenever the sleeve is raised or lowered a height equal to the distance between two consecutive depressions, the effective size of the outlet opening of the corresponding spout is varied five per cent.; but it will of course be understood that the graduating need not be done in five per cent. steps. When a sleeve is lowered until the uppermost depression is brought to the level of the holding catch or plunger, the outlet opening is completely closed and, in order to obtain any desired degree of opening, the sleeve is simply raised until the proper depression is brought to the level of the holding member.

There is associated with each of the spouts an L-shaped blade or scraper, 18, one arm of which extends from the inner edge of the table outwardly across the open side of the corresponding spout while the other arm extends in a direction more or less circumferential of the table on the outer side of the spout; the inner arm of the scraper being spaced apart somewhat from the spout and lying transverse to any radius which can be drawn through the same from the center of the table. The disposition of the scrapers is best shown in Fig. 8. The lower edges of the scrapers extend close to the table so that when the latter is rotated in the counterclockwise direction as viewed in Fig. 8, any material which has been discharged upon the table by any one of the spouts, will be carried against the corresponding scraper and will be pushed inwardly toward the open center of the table and be discharged into the funnel-shaped receiver. It will be seen that material may be received on the table from any one or any number of spouts and, the table being properly rotated, this material may be scraped into the receiver in small quantities at a time so that an intimate mixture of the various materials will be obtained. It will further be seen that by shifting the controlling sleeves and setting them in the desired positions, any desired number of ingredients, in any desired proportions, may be measured out and mixed; it being only necessary that a sufficient head of material be maintained in each spout to insure the proper discharge at the outlet end when it is intended that there should be a discharge.

Each spout is preferaby provided with a suitable valve or closure independent of the measuring sleeve. This may conveniently take the form of a sliding gate such as indicated at 19.

The table is rotated by means of a pinion, 20, meshing with teeth, 21, arranged on the under side of the table. The pinion is fixed to a shaft, 22, on which there is loosely arranged a driving pulley, 23. On a shaft, 24, extending through the lower end of the receiver, is a stirring device, 25, located in the receiver, the shaft, 24, being driven from the shaft 22 by any suitable means such, for example, as a chain and sprocket drive, 26. The stirrer, 25, serves both to insure intimate mixture of the goods passing through the machine and to prevent the goods from clogging in the receiver if they are properly withdrawn at the outlet end of the receiver.

The driving connection between the driving pulley and the shaft 22 is effected through a suitable clutch the details of which are best illustrated in Figs. 13 to 17. Referring to these figures, 28 is a drum fixed to the driving pulley, having the inner surface of its annular flange, 29, in the form of a connected series of depressions, 30. Fixed to the shaft is a disk, 31, carrying a dog, 32, which is mounted so as to swing at its inner end about an axis parallel with the axis of the shaft and at its outer end engage with any one of the depressions, 30, in the clutch drum; a spring, 33, acting on the dog in a direction tending constantly to hold it swung outwardly in its clutching position as shown in full lines in Fig. 16. The dog may conveniently be affixed to one end of a short shaft, 34, which extends through the disk, 31, and is long enough to carry on its other end a dog-actuating device, 35.

A swinging clutch lever, 36, is located adjacent to the clutch, as best shown in Figs. 2, 3 and 7; the clutch lever being provided with a stop or shoulder, 37, in position to come into the path of travel of the dog-actuating member, 35, when the lever is shifted into its unclutching position. The parts are so proportioned that when the lever is positioned so as to bring the shoulder, 37, into the path of the member 35, the latter member, upon striking the shoulder, is arrested and it and the dog to which it is connected are brought into the dotted line positions illustrated in Figs. 16 and 17; thus withdrawing the dog from clutching engagement with the driving member of the clutch and disconnecting the driving pulley from the shaft.

The shoulder, 37, on the clutch lever is preferably made yieldable under the impact of the dog-actuating device so as not to place too abrupt a load on the parts and for the further purpose of permitting slack or lost motion to be taken up and prevent the clutch from rattling when in its unclutched position. To this end, the shoulder, 37, may conveniently be formed on the upper end of a bar, 38, lying beside the clutch lever and slidably connected thereto by bolts, 39, passing through slots, 40, elongated in the direction of the length of the clutch lever; a spring, 41, arranged between the upper of the bolts, 39, and the clutch lever and tending constantly to hold the bar with its shoulder in the uppermost position. The spring permits the shoulder to yield under the impact of the clutch actuator, 35, but thereafter lifts the shoulder when the unclutching has been effected, so as to insure that the clutch dog will be held positively in its extreme unclutching position.

There are two conditions under which it is desirable that the machine be automatically stopped namely, when the receiver is not properly emptied and it therefore becomes filled, and when any one of the delivering spouts which is supposed to be in action is not receiving material and therefore cannot deliver it to the machine. In accordance with my invention I have provided means whereby, upon the occurrence of either of these conditions, the clutch lever will be shifted so as to stop the machine.

The means for actuating the clutch lever when the receiver becomes choked, which may occur through a failure properly to withdraw the mixture from the outlet end of the receiver, is best illustrated in Fig. 7. Referring to this figure, it will be seen that there is on one side of the receiver a gate or flap, 42, fixed at its upper end to an oscillating shaft, 43, and having downwardly-extending side flanges, 44. On the outside of the receiver, in the vicinity of the upper end of the member 42, is a counterweighted bell crank lever, 45. One arm of the bell crank lever is connected to the clutch-actuating lever by means of a connecting rod, 46. The gate or flap is connected to the counterweighted lever, 45, in any suitable way as, for example, by means of a link, 48; whereby, as the gate or flap oscillates, the bell crank lever is caused to oscillate in unison therewith. Normally the parts occupy the positions shown in full lines in Fig. 7, the weight of the falling streams of material having no effect on the gate or flap. However, in case the receiver becomes filled with material to a point above the member 42, the weight of the goods will serve to depress the latter so as to swing the parts into the positions illustrated in dotted lines namely, shift the clutch lever into its clutch-releasing position.

The means for stopping the machine when one of the working spouts is not receiving material is best shown in Figs. 1 and 18 to 23. Referring to these figures, 50 represents a horizontal rock shaft suitably supported in proximity to the upper end of the clutch lever. An arm, 51, extending from the rock shaft to the clutch lever serves the purpose of actuating the lever when the rock shaft is turned. The rock shaft, 50, may be actuated by means of devices associated with each spout. In the upper end of each spout, is a gate or flap, 52, hinged at its upper end and provided with a suitable counterweight, 53, which tends constantly to swing it into the position shown in dotted lines in Fig. 18; namely across the spout so as to be in the line of downward flow of material through the spout. Whenever a spout is brought into play the material should be fed to it rapidly enough to insure that the spout will remain filled. As soon as a spout becomes filled up above the point of the controlling gate or flap therein, the controlling gate or flap is pressed out of the way into the position shown in full lines as aforesaid; but, if for any reason the spout does not remain filled to the proper point, the counterweight is free to throw the controlling gate or flap into the positions illustrated in dotted lines. In other words, the member 52 is a restraining device for the counterweight which can be effective only when acted on by the material in a full spout. Each counterweight is connected to a corresponding arm, 54, on the rock shaft 50 through a connecting rod, 55; there being a lost motion in the connection which may conveniently be secured by means of a pin and slot, 56, whereby any counterweight which is being restrained will not interfere with the proper operation of the rock shaft by a counter weight which is not restrained. The parts, as will be understood, are so proportioned that whenever a counterweight is left free to act, that is whenever the corresponding spout is not full, it will rotate the rock shaft in the proper direction to throw out the clutch and thus automatically stop the machine. If desired, suitable means may be provided for locking each of the counterweights, 53, in its inoperative or idle position, so that it will not interfere with the proper operation of the machine when the corresponding spout is not in use. This may conveniently be accomplished by hanging on each of the connecting rods, 55, a post or finger, 57, which, as illustrated in Fig. 23, may have its free end brought to rest against the supporting pin or shaft, 58, for the counterweight, thus holding the counterweight in the same position in which it is held by the controlling gate when the corresponding spout is full.

In order that a check may be had as to the accuracy of the relative proportions in which the materials are discharged, a suitable registering meter may be placed in the inlet end of each spout. By examining the meters from time to time the attendant can ascertain whether the work is being done within desired limits of accuracy. In the arrangement shown, there is at the upper end of each of the spouts a meter casing, 60, within which is a rotatable member, 61, divided into a series of buckets or compartments. Material is delivered into the top of each meter casing through a conduit, 62, so placed that the incoming material rotates the metering element by filling the compartments one after the other and thus causing it to become overbalanced on one side. The metering element is connected in any suitable way to a suitable register, 63.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. In a machine of the character described, a rotatable table, delivery spouts arranged above and projecting down in proximity to the top of the table, each spout being open at the bottom and having a section removed on one side at the lower end to permit it to discharge laterally in the direction in which the table is traveling, and an adjustable gate associated with the lower end of each spout and adapted to vary the area of the lateral-discharge opening.

2. In a machine of the character described, a rotatable table, delivery spouts arranged above and projecting down in proximity to the top of the table, each spout being open at the bottom and having a section removed on one side at the lower end to permit it to discharge laterally in the direction in which the table is traveling, and a vertically-adjustable sleeve surrounding the lower end of each spout.

3. In a machine of the character described, a rotatable table having an open center, a receiver below said open center, a series of stationary scrapers distributed above the table and extending outwardly from said open center, and a delivery spout terminating above the table in advance of each of said scrapers, each of said scrapers extending at such an angle to a radius passing through the same from the center of the table that the material delivered by the spouts upon the table is forced inwardly by the scrapers as the table rotates and caused to fall through said open center into the receiver.

4. In a machine of the character described, a rotatable table, a receiver lying below the table, a series of delivery spouts located above the table, means for scraping into the receiver material delivered upon the table from said spouts while the table is rotating, and means under the control of material in the receiver for stopping the rotation of the table.

5. In a machine of the character described, a rotatable table, vertical delivery spouts arranged above the table and terminating in discharge outlets adjacent to the table top, and means under the control of material in said spouts for rotating the table.

6. In a machine of the character described, a horizontal rotatable table open at the center, a stationary horizontal ring arranged above the table around said center, delivery spouts distributed along said ring and held thereby with their lower ends extending into proximity to the table, a receiver below the open center of the table, and means for scraping from the table into the receiver material discharged on the table by said spouts.

7. In a machine of the character described, a rotatable table, a series of spouts arranged in a circle above the table and extending into proximity to the latter, the lower ends of the spouts being open and the spouts having sections removed from the lower ends at corresponding sides so as to form laterally discharging outlets, means associated with said outlets for varying their effective areas, and stationary scrapers extending across the table and each facing one of said outlets, the scrapers being arranged to cause the material discharged on the table from said spouts to be deflected over the edge of the table when the table is rotated.

8. In a machine of the character described, a rotatable table, vertical delivery spouts arranged above the table and terminating in discharge outlets adjacent to the table top, means for controlling the rate at which the material is discharged from said spouts, a controller for said table, a controller-actuator associated with each spout, and a member in each spout associated with the corresponding actuator and adapted to be acted upon by material in the spout.

9. In a machine of the character described, a rotatable table, vertical delivery spouts arranged above the table and terminating in discharge outlets adjacent to the table top, means for controlling the rate at which the material is discharged from said spouts, mechanism for rotating the table, a device for stopping said rotating mechanism, and means associated with each spout for controlling said device, said means including a swinging gate tending normally to extend across the corresponding spout and adapted to be swung laterally against the side of the latter by the weight of the material in the spout when the latter is full.

10. In a machine of the character described, a rotatable table, vertical delivery spouts arranged above the table and terminating in discharge outlets adjacent to the table top, means for controlling the rate at which the material is discharged from said spouts, mechanism for rotating the table, a controller for said mechanism, a controller-actuator associated with each spout, a gate lying within each spout and connected to the corresponding actuator so as to hold the latter in an idle position when the spout is full, and means for locking each actuator in said idle position independently of the corresponding gate.

11. In a machine of the character described, a rotatable table, vertical delivery spouts arranged above the table and terminating in discharge outlets adjacent to the table top, means for controlling the rate at which the material is discharged from said spouts, mechanism for rotating the table, a device for stopping said mechanism, means associated with each spout for controlling said device, said means including a swinging gate tending normally to extend across the corresponding spout and adapted to be swung laterally against the side of the latter by the weight of the material in the spout when the latter is full, and a shut-off valve in each spout at a point below the gate therein.

12. In a machine of the character described, a horizontal rotatable table open at the center, a series of delivery spouts distributed above the table about said open center and having their lower ends extending into proximity to the table, a receiver below said open center of the table, and means for scraping from the table into the receiver material discharged on the table by said spouts.

13. In a machine of the character described, a horizontal rotatable table open at the center, a series of delivery spouts distributed above the table about said open center and having their lower ends extending into proximity to the table, a receiver below said open center of the table, and a series of stationary L-shaped scrapers lying above said table; each of said scrapers being so positioned that one of said spouts lies in the angle thereof, one arm thereof extending in the circumferential direction along the outer side of the spout, and the other arm extending inwardly to the inner edge of the table at an acute angle to a radius from the center of the table through said spout.

14. In a machine of the character described, a rotatable table, delivery spouts arranged above and projecting down in proximity to the top of the table, each spout being open at the bottom and having a section removed on one side at the lower end to permit it to discharge laterally in the direction in which the table is traveling, and a stationary scraper extending across the top of the table on the open side of each of said spouts, each scraper extending across the table from one edge thereof in a direction forming an obtuse angle with the direction of travel of material carried to the table from the corresponding spout.

In testimony whereof, I sign this specification.

GEORGE HOEPNER.